Patented May 11, 1954

2,678,329

UNITED STATES PATENT OFFICE 2,678,329

DIALKYL MONOARYL ESTERS OF ORTHO-PHOSPHORIC ACID

Harry R. Gamrath and Roger E. Hatton, St. Louis, Mo., assignors to Monsanto Chemical Company, St. Louis, Mo., a corporation of Delaware No Drawing. Application November 6, 1950, Serial No. 194,373

10 Claims. (Cl. 260—461)

This invention relates to dialkyl monoaryl esters of ortho-phosphoric acid; more specifically, this invention relates to a new and unusual class of dialkyl monoaryl esters of ortho-phosphoric acid having the formula

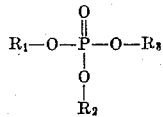

wherein $R_1$ represents an alkyl radical containing from 1 to 6 carbon atoms in which there are at least two hydrogen substituents on the carbon atom bonded to the phosphate radical, $R_2$ represents an alkyl radical containing not more than 10 carbon atoms and in which there are at least two hydrogen substituents on the carbon atom bonded to the phosphate radical, and $R_2$ differing from $R_1$ by at least 4 carbon atoms, and $R_3$ represents a phenyl radical which may be unsubstituted or substituted with one or more inert substituents. Typical of such inert substituents are the halogens, such as chlorine, bromine, iodine and fluorine; alkyl groups, such as methyl, ethyl, propyl, isopropyl, butyl, octyl; alkoxy groups, such as methoxy, ethoxy, propoxy, isopropoxy, etc; aryl groups, such as phenyl; nitro groups, etc.

Because of their very low pour point, high autogeneous ignition temperature, stability against decomposition and most unusual and unexpected excellent physical characteristics at extremely low temperatures, the novel dialkyl monoaryl phosphate esters of this invention have been found to possess outstanding utility in the field of functional fluids where they are particularly useful as synthetic lubricants and force transmission fluids, having exceptionally high inherent lubricity. Furthermore, because of their compatibility with paraffinic hydrocarbon oils, these dialkyl monoaryl phosphates may be combined with paraffinic hydrocarbon oils to prepare hydraulic and torque converter fluids of highly desirable characteristics. Moreover, these esters have a wide variety of other uses, such as film forming addition agents for extreme pressure lubricants and as the liquid medium for filters for air-conditioning systems.

The novel esters of this invention may be prepared by reacting a primary alkyl alcohol containing from 1 to 6 carbon atoms and phosphorus oxychloride to form a monoalkyl phosphoryl dichloride, reacting the monoalkyl phosphoryl dichloride thus formed and a primary alkyl alcohol containing not more than 10 carbon atoms and differing from the first used alcohol by at least 4 carbon atoms, to form a dialkyl phosphoryl monochloride, and reacting the dialkyl phosphoryl monochloride thus formed and an alkali metal salt of a phenol in an aqueous medium. Alternatively, the dialkyl phosphoryl monochloride described above may also be prepared by reacting a primary alkyl alcohol containing from 1 to 10 carbon atoms and POCl₃ to form a monoalkyl phosphoryl dichloride, reacting the monoalkyl phosphoryl dichloride thus formed with a primary alkyl alcohol containing not more than 6 carbon atoms and differing from the first used primary alkyl alcohol by at least 4 carbon atoms, to form a dialkyl phosphoryl monochloride. The following examples are illustrative, but not limitative, of the novel phosphate esters of this invention and their manner of preparation:

EXAMPLE I

*2-Ethylhexyl n-butyl phenyl phosphate*

A round-bottom, 3-neck flask, fitted with a stirrer, a thermometer, a dropping funnel and an exhaust vent is charged with 153.4 g. of phosphorus oxychloride. To the stirred phosphorus oxychloride, cooled below 15° C., is added dropwise 130.2 g. of 2-ethylhexanol, maintaining the reaction-mass temperature in the range of from 10°–15° C. After all of the 2-ethylhexanol is added, the temperature of the reaction mixture is allowed to rise to about 25° C. When the evolution of gaseous hydrogen chloride has essentially stopped, the reaction mixture is placed under vacuum, the pressure being gradually reduced until an absolute pressure of 50–75 mm. Hg is attained at about 25° C.

When essentially all of the hydrogen chloride has been removed, the vacuum is released and the reaction mixture again cooled to below 15° C. With constant agitation, 8.15 g. of n-butyl alcohol are added drop-wise while maintaining a reaction temperature in the range of 10°–15° C. After all of the n-butanol has been added, stirring of the reaction mixture is continued and the temperature allowed to rise gradually to about 25° C. The reaction mixture is again placed under reduced pressure until a final absolute pressure of about 25 mm. Hg is attained at 25° C. Under such conditions the reaction mixture is stirred for approximately 40 hours.

150 g. of water and 107 g. of phenol are then charged to a round-bottom, 3-neck flask, fitted with a stirrer, a thermometer and dropping funnel. With constant agitation 90.4 g. of a 50% aqueous solution of sodium hydroxide are then added to the phenol-water mixture. The 2-ethylhexyl n-butyl phosphoryl monochloride prepared as previously described is then added to the stirred sodium phenate solution while maintaining a reaction temperature of about 20°–25° C. After all of the dialkyl phosphoryl monochloride is charged, stirring of the reaction mixture is continued for about three more hours. The reaction mixture is then allowed to settle, separate into two layers, and the aqueous layer withdrawn and discarded.

The ester layer is then washed with dilute aqueous sodium hydroxide and then steamed to remove volatile materials. The ester is then washed with water until neutral and then dried by heating under reduced pressure. Approximately 302 g. of 2-ethylhexyl n-butyl phenyl phosphate are obtained having the following properties:

| | |
|---|---|
| Specific gravity at 25°/25° C | 1.0212 |
| $N_D^{25}$ | 1.4698 |
| Pour point | Below −70° F. |
| Flash point | 395° F. |
| Fire point | 460° F. |
| A.I.T. (glass) | 1060° F. |
| Viscosity, centistokes at— | |
| 210° F | 1.85 |
| 100° F | 6.15 |
| −40° F | 641 |
| Shell Four-Ball Wear Test: | |
| Steel on steel— | |
| 1 kg mm | 0.17 |
| 40 kg mm | 0.77 |
| Steel on bronze— | |
| 1 kg mm | 0.61 |
| 40 kg mm | 1.26 |

EXAMPLE II

*n-Octyl n-butyl phenyl phosphate*

In accordance with the procedure described in Example I, n-octyl n-butyl phenyl phosphate is obtained utilizing the following ingredients:

| | Grams |
|---|---|
| Phosphorus oxychloride | 383.5 |
| n-Octanol | 325.3 |
| n-Butanol | 192.7 |
| Phenol | 244.4 |
| Sodium hydroxide (assay 47.6%) | 218.5 |
| Water | 375.0 |

The n-octyl n-butyl phenyl phosphate thus obtained has the following properties:

| | |
|---|---|
| Specific gravity at 25°/25° C | 1.0569 |
| $N_D^{25}$ | 1.4663 |
| Pour point | Below −70° F. |
| Viscosity, centistokes at— | |
| 210° F | 2.09 |
| 100° F | 6.25 |
| −40° F | 410 |

EXAMPLE III

*2-ethylhexyl n-butyl cresyl phosphate*

In accordance with the procedure described in Example I, 2-ethylhexyl n-butyl cresyl phosphate is obtained utilizing the following ingredients:

| | Grams |
|---|---|
| Phosphorus oxychloride | 153.4 |
| 2-ethylhexanol | 130.2 |
| n-Butanol | 81.5 |
| Cresol | 110.2 |
| Sodium hydroxide (assay 49.6%) | 82.3 |
| Water | 160.0 |

The 2-ethylhexyl n-butyl cresyl phosphate thus obtained has the following properties:

| | |
|---|---|
| Specific gravity at 25°/25° C | 1.0110 |
| $N_D^{25}$ | 1.4719 |
| Viscosity, centistokes at— | |
| 210° F | 2.24 |
| 100° F | 8.09 |
| −40° F | 1370 |

EXAMPLE IV

*2-ethylhexyl isobutyl phenyl phosphate*

In accordance with the procedure described in Example I, 2-ethylhexyl isobutyl phenyl phosphate is obtained utilizing the following ingredients:

| | Grams |
|---|---|
| Phosphorus oxychloride | 153.4 |
| 2-ethylhexanol | 130.2 |
| Isobutanol | 74.1 |
| Phenol | 107.0 |
| Sodium hydroxide (assay 48.1%) | 95.5 |
| Water | 160.0 |

The 2-ethylhexyl isobutyl phenyl phosphate thus obtained has the following properties:

| | |
|---|---|
| Specific gravity at 25°/25° C | 1.0241 |
| $N_D^{25}$ | 1.4720 |
| Pour point | Below −70° F. |
| Viscosity, centistokes at— | |
| 210° F | 1.97 |
| 100° F | 6.94 |
| −40° F | 1365 |

EXAMPLE V

*2-ethylhexyl methyl phenyl phosphate*

In accordance with the procedure described in Example I, 2-ethylhexyl methyl phenyl phosphate is obtained utilizing the following ingredients:

| | Grams |
|---|---|
| Phosphorus oxychloride | 153.4 |
| 2-ethylhexanol | 130.2 |
| Methanol | 35.2 |
| Phenol | 108.4 |
| Sodium hydroxide (assay 46.4%) | 99.4 |
| Water | 155.0 |

The 2-ethylhexyl methyl phenyl phosphate thus obtained has the following properties:

| | |
|---|---|
| Specific gravity at 25°/25° C | 1.0613 |
| $N_D^{25}$ | 1.4302 |
| Pour point | Below −70° F. |
| Viscosity, centistokes at— | |
| 210° F | 2.01 |
| 100° F | 6.95 |
| −40° F | 1320 |

EXAMPLE VI

*Decyl methyl phenyl phosphate*

In accordance with the procedure described in Example I, decyl methyl phenyl phosphate is obtained utilizing the following ingredients:

| | Grams |
|---|---|
| Phosphorus oxychloride | 153.4 |
| Decanol | 158.2 |
| Methanol | 35.2 |
| Phenol | 108.4 |
| Sodium hydroxide (assay 46.4%) | 99.4 |
| Water | 160.0 |

EXAMPLE VII

*Nonyl isoamyl phenyl phosphate*

In accordance with the procedure described in Example I, nonyl isoamyl phenyl phosphate is obtained utilizing the following ingredients:

|  | Grams |
|---|---|
| Phosphorus oxychloride | 153.4 |
| Nonyl alcohol | 144.2 |
| Isoamyl alcohol | 92.5 |
| Phenol | 108.4 |
| Sodium hydroxide (assay 46.4%) | 99.4 |
| Water | 160.0 |

EXAMPLE VIII

*n-Octyl n-butyl cresyl phosphate*

In accordance with the procedure described in Example I, n-octyl n-butyl cresyl phosphate is obtained utilizing the following ingredients:

|  | Grams |
|---|---|
| Phosphorus oxychloride | 153.4 |
| n-Octanol | 130.1 |
| n-Butanol | 77.1 |
| Cresol | 112.3 |
| Sodium hydroxide (assay 47.6%) | 87.4 |
| Water | 160.0 |

The process for the preparation of the novel esters of this invention as set forth in particular detail in the preceding examples is subject to substantial variation. The reaction between the primary alkyl alcohol and $POCl_3$ to form the monoalkyl phosphoryl dichloride may be carried out over a wide temperature range. The practical temperature range limits of this reaction are governed principally by the freezing point of $POCl_3$ and the color of the finished product desired. Since $POCl_3$ crystallizes at approximately 2° C., initial reaction temperatures below 2° C. are not practical. Once the reaction is begun, the temperature may then be reduced below 2° C. as the added alcohol and the alkyl phosphoryl dichloride formed depress the crystallizing point of the mass so that lower temperatures may be maintained. As the temperature of the reaction is increased greater than about 25° C., the color of the monoalkyl phosphoryl dichloride is increased resulting in more highly colored dialkyl monoaryl phosphate esters. Thus, the preferred and practical temperature range of this reaction is from about 2° C. to about 25° C. After the reaction is substantially complete, the temperature may be increased to a maximum of 50° C. to facilitate the removal of the hydrogen chloride gas evolved in the reaction.

In the preparation of the dialkyl phosphoryl monochloride by reacting the monoalkyl phosphoryl dichloride and a primary alcohol as previously described, the reaction temperature may also be varied over a wide range, but it is preferably maintained within the range of from about −10° C. to about +50° C.

For the preparation of the monoalkyl phosphoryl dichloride and the dialkyl phosphoryl monochloride, approximately equimolecular proportions of the reactants are preferred. Excessive quantities of the alcohol may, however, be utilized if desired. As high as 50% excess of the alcohol has been found to be procedurally satisfactory. The excess alcohol can be subsequently removed by steaming or any other procedure well known to those skilled in the art.

The reaction between the dialkyl phosphoryl monochloride and the alkali metal salt of a phenol is conveniently carried out in an aqueous medium utilizing preferably an aqueous solution of the alkali metal salt of a phenol. It is preferred that approximately one molecular proportion of the alkali metal phenate be used for each one molecular proportion of the dialkyl phosphoryl monochloride. Excessive quantities of the alkali metal phenate have no deleterious effect upon the nature of the reaction, affecting merely the purification technique. The greater the excess of the alkali metal phenate utilized, the more difficult will be the purification of the resultant dialkyl monoaryl phosphate ester. The reaction between the alkali metal phenate and the dialkyl phosphoryl monochloride is preferably carried out at a temperature in the range of from about −10° to about +50° C. Higher temperatures may be utilized but result in more highly colored phosphate esters.

The esters prepared according to this process are of such a degree of purity that purification by fractionation is unnecessary, unless specifically desired. Usually all that is required are simple water and aqueous alkali washes followed by dehydration under vacuum. At times, however, it may be necessary to subject some of the more difficultly purified esters to a simple steaming procedure to remove the last traces of alcohol or other volatile material. This steaming operation can then be followed by dehydration of the ester in the normal manner.

The outstanding utility of the novel esters of this invention is made clearly evident by a careful consideration of the physical properties of these esters as set forth in the preceding examples with particular reference to the unusual physical characteristics of these materials. Many types of materials have been suggested as functional fluids. It has been particularly difficult, however, to find materials which have satisfactory viscosity characteristics at below normal temperature in addition to the other characteristics which a functional fluid must necessarily have, namely lubricity, good fire-retardancy, stability and low volatility. Various types of phosphate esters have been suggested and tried as functional fluids. The trialkyl phosphate esters are much too volatile for over-all utility. The monoalkyl diaryl phosphate esters exhibit a significant increase in viscosity at sub-normal temperatures. Triaryl phosphates solidify at relatively high temperatures, rendering their utility at low temperatures impractical. Dialkyl monoalkyl phosphate esters wherein the two alkyl groups contain an equal number of carbon atoms or wherein the two alkyl groups are greater than 6 and 10 carbon atoms respectively, also exhibit higher viscosity at low temperatures which restricts their use in the functional fluid field. Thus, while the prior ortho-phosphate esters are generally recognized as having some application as functional fluids, their utility at relatively low temperatures has been significantly restricted. As a result of this invention, however, a particular narrow class of phosphate esters are provided which quite surprisingly and unexpectedly exhibit outstandingly good viscosity characteristics at low temperatures, thereby for the first time permitting the use of a phosphate ester possessing the characteristic properties of low flammability, excellent lubricity and excellent stability as a functional fluid under conditions which heretofore prevented the use of phosphate esters.

The outstanding viscosity characteristics of the novel esters of this invention is readily seen from the comparative data set forth in the following table:

|  | Viscosity in Centistokes | | |
| --- | --- | --- | --- |
|  | 210° F. | 100° F. | −40° F. |
| 2-Ethylhexyl n-butyl phenyl phosphate | 1.85 | 6.15 | 641 |
| 2-Ethylhexyl n-butyl cresyl phosphate | 2.24 | 8.09 | 1370 |
| 2-Ethylhexyl isobutyl phenyl phosphate | 1.97 | 6.94 | 1365 |
| 2-Ethylhexyl methyl phenyl phosphate | 2.01 | 6.95 | 1320 |
| Di(2-ethylhexyl) phenyl phosphate | 2.28 | 8.67 | 1820 |
| 2-Ethylhexyl capryl phenyl phosphate | 2.26 | 8.58 | 1710 |
| 2-Ethylhexyl dodecyl cresyl phosphate | 3.55 | 17.06 | 6200 |

Referring to the above table, a comparison of the viscosity characteristics of the novel esters of this invention with the viscosity characteristics of other compounds, such as di(2-ethylhexyl) phenyl phosphate, 2-ethylhexyl capryl phenyl phosphate and 2-ethylhexyl dodecyl cresyl phosphate, clearly indicates the outstanding and unexpected characteristics of the novel esters of this invention and their resultant enhanced utility. The novel phosphate esters of this invention may be utilized as functional fluids under low temperature conditions which heretofore prevented the use of phosphate esters broadly.

What is claimed is:

1. As new chemical compounds, dialkyl monoaryl phosphate esters having the formula:

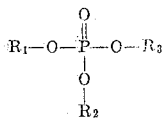

wherein $R_1$ is an alkyl radical containing 1 to 6 carbon atoms in which there are at least two hydrogen substituents on the carbon atom bonded to the phosphate radical, $R_2$ is an alkyl radical containing not more than 10 carbon atoms in which there are at least two hydrogen substituents on the carbon atom bonded to the phosphate radical, and $R_2$ differing from $R_1$ by at least four carbon atoms, and $R_3$ represents a phenyl radical.

2. As new chemical compounds, dialkyl monoaryl phosphate esters having the formula:

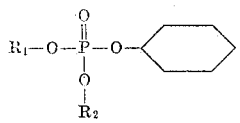

wherein $R_1$ is an alkyl radical containing 1 to 6 carbon atoms in which there are at least 2 hydrogen substituents on the carbon atom bonded to the phosphate radical, $R_2$ is an alkyl radical containing not more than 10 carbon atoms in which there are at least 2 hydrogen substituents on the carbon atom bonded to the phosphate radical, and $R_2$ differing from $R_1$ by at least 4 carbon atoms.

3. As new chemical compounds, dialkyl monoaryl phosphate esters having the formula:

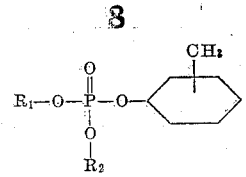

wherein $R_1$ is an alkyl radical containing 1 to 6 carbon atoms in which there are at least 2 hydrogen substituents on the carbon atom bonded to the phosphate radical, $R_2$ is an alkyl radical containing not more than 10 carbon atoms in which there are at least 2 hydrogen substituents on the carbon atom bonded to the phosphate radical and $R_2$ differing from $R_1$ by at least 4 carbon atoms.

4. As new chemical compounds, dialkyl monoaryl phosphate esters having the formula:

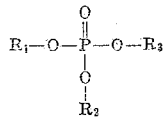

wherein $R_1$ is an alkyl radical containing 4 carbon atoms in which there are at least 2 hydrogen substituents on the carbon atom bonded to the phosphate radical, $R_2$ is an alkyl radical containing 8 carbon atoms in which there are at least 2 hydrogen substituents on the carbon atom bonded to the phosphate radical, and $R_3$ is a phenyl radical.

5. As new chemical compounds, dialkyl monoaryl phosphate esters having the formula:

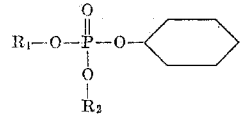

wherein $R_1$ is an alkyl radical containing 4 carbon atoms in which there are at least 2 hydrogen substituents on the carbon atom bonded to the phosphate radical, $R_2$ is an alkyl radical containing 8 carbon atoms in which there are at least 2 hydrogen substituents on the carbon atom bonded to the phosphate radical.

6. n-Octyl n-butyl phenyl phosphate.
7. n-Octyl n-butyl cresyl phosphate.
8. 2-ethylhexyl n-butyl phenyl phosphate.
9. 2-ethylhexyl n-butyl cresyl phosphate.
10. 2-ethylhexyl isobutyl phenyl phosphate.

References Cited in the file of this patent

UNITED STATES PATENTS

| Number | Name | Date |
| --- | --- | --- |
| 1,869,768 | Nicolai | Aug. 2, 1932 |
| 2,005,619 | Graves | June 18, 1935 |
| 2,285,853 | Downing | June 9, 1942 |
| 2,520,393 | Fletcher | Aug. 29, 1950 |

OTHER REFERENCES

Morel: Bull. Soc. Chim. (3rd Series), vol. 21, pages 491–497 (1899).

Saunders et al.: J. Chem. Soc. (1948), pages 699–703.